US010807317B2

(12) United States Patent
Chau et al.

(10) Patent No.: US 10,807,317 B2
(45) Date of Patent: Oct. 20, 2020

(54) FILM-APPLYING DEVICE AND METHOD FOR 3D GLASS WITH TWO OPPOSITE CURVED EDGES

(71) Applicant: LENS TECHNOLOGY (CHANGSHA) CO., LTD., Changsha, Hunan (CN)

(72) Inventors: Kwan Fei Chau, Hunan (CN); Qiaobing Rao, Hunan (CN); Chang Zhou, Hunan (CN)

(73) Assignee: LENS TECHNOLOGY (CHANGSHA) CO., LTD., Changsha, Hunan (CN)

( * ) Notice: Subject to any disclaimer, the term of this patent is extended or adjusted under 35 U.S.C. 154(b) by 201 days.

(21) Appl. No.: 16/095,378

(22) PCT Filed: Sep. 19, 2016

(86) PCT No.: PCT/CN2016/099357
§ 371 (c)(1),
(2) Date: Oct. 22, 2018

(87) PCT Pub. No.: WO2017/185591
PCT Pub. Date: Nov. 2, 2017

(65) Prior Publication Data
US 2019/0126565 A1    May 2, 2019

(30) Foreign Application Priority Data

Apr. 28, 2016  (CN) .......................... 2016 1 0277657
Apr. 28, 2016  (CN) ..................... 2016 2 0381610 U

(51) Int. Cl.
*B29C 65/78*    (2006.01)
*B29C 63/00*    (2006.01)
(Continued)

(52) U.S. Cl.
CPC ...... *B29C 65/7835* (2013.01); *B29C 63/0004* (2013.01); *B29C 63/0073* (2013.01);
(Continued)

(58) Field of Classification Search
None
See application file for complete search history.

(56) References Cited

U.S. PATENT DOCUMENTS

2014/0116598 A1    5/2014  Lee
2016/0009025 A1*   1/2016  Lee ........................ B32B 37/025
                                                    156/324

FOREIGN PATENT DOCUMENTS

CN    103192581 A    7/2013
CN    104943900 A    9/2015
(Continued)

OTHER PUBLICATIONS

The Japanese 1st Office Action for JP2019-506768, dated Nov. 5, 2019.

(Continued)

*Primary Examiner* — Jeffry H Aftergut
(74) *Attorney, Agent, or Firm* — Yu (Robert) Xu; Apex Attorneys at Law, LLP

(57) ABSTRACT

A film-applying device and method for 3D glass with two opposite curved edges. The film-applying device comprises: an upper base for fixing a film; a lower base for fixing the 3D glass; a roller structure for rotating a rotary cylinder of the upper base; and a lifting cylinder for moving the upper base, the rotary cylinder, and the roller structure up and down and making the roller structure apply a pressure to press-fit the 3D glass and the film. The roller structure comprises a lower roller and an upper press roller; the rotary cylinder is used for rotating the upper base to change or fix the relative position of the upper base and the roller struc- (Continued)

ture. The device has a simplified structure. The device and method are suitable for applying a film to 3D glass with two opposite curved edges due to convenient operations, high film-applying precision and efficiency.

19 Claims, 7 Drawing Sheets

(51) Int. Cl.
 B65B 33/00 (2006.01)
 B29C 63/02 (2006.01)
 B29C 65/00 (2006.01)
 B32B 37/00 (2006.01)
 B32B 37/10 (2006.01)
 B29L 31/34 (2006.01)

(52) U.S. Cl.
 CPC ........ *B29C 63/024* (2013.01); *B29C 66/8362* (2013.01); *B32B 37/0053* (2013.01); *B32B 37/10* (2013.01); *B65B 33/00* (2013.01); *B29C 63/0047* (2013.01); *B29C 63/0095* (2013.01); *B29C 2063/0008* (2013.01); *B29L 2031/3437* (2013.01); *B29L 2031/3475* (2013.01); *B32B 2315/08* (2013.01); *B32B 2457/20* (2013.01)

(56) References Cited

FOREIGN PATENT DOCUMENTS

| CN | 204620317 U | | 9/2015 |
| CN | 204659133 U | | 9/2015 |
| CN | 205380968 U | | 7/2016 |
| JP | 2013-131129 A | * | 7/2013 |
| JP | 2013131129 A | | 7/2013 |
| KR | 100903529 B1 | | 6/2009 |
| KR | 10-1214537 A | * | 12/2012 |
| KR | 10-1470935 A | * | 12/2014 |

OTHER PUBLICATIONS

International Search Report for PCT/CN2016/099357 dated Jan. 5, 2017, ISA/CN.

* cited by examiner (a) (b)

FILM-APPLYING DEVICE AND METHOD FOR 3D GLASS WITH TWO OPPOSITE CURVED EDGES

The present application is the national phase of International Application No. PCT/CN2016/099357, titled "FILM-APPLYING DEVICE AND METHOD FOR 3D GLASS WITH TWO OPPOSITE CURVED EDGES", filed on Sep. 19, 2016, which claims the priorities to Chinese Patent Applications No. 201610277657.1 and No. 201620381610.5 both titled "FILM-APPLYING DEVICE AND METHOD FOR 3D GLASS WITH TWO OPPOSITE CURVED EDGES", filed on Apr. 28, 2016 with the State Intellectual Property Office of the People's Republic of China, the entire disclosures of which applications are incorporated herein by reference.

FIELD

This application relates to the technical field of film applying, and in particular to a film applying apparatus and method for 3D glass with two opposite curved edges.

BACKGROUND

Film adhesion for curved glass with two bent edges refers to a method for applying a textured and colored decorative film (usually a film) to a concave surface of the curved glass with two bent edges through rolling by rollers.

Applying a decorative film to protective glass is mostly employed in mobile phone panels. Compared with glass, a film is more convenient for texture transfer printing, and when performing screen printing with films, multiple pieces of films can be printed at one time, which, compared with that one single piece of glass is printed by screen printing at one time, greatly improves the production efficiency. Besides, due to the special structure of the curved glass with two bent edges, it would be inconvenient to screen print a pattern thereon, and it cannot be ensured that the length, width and position dimensions of a view window area obtained from screen printing are accurate. However, these disadvantages will be addressed by first screen printing the pattern on a film and then applying the film to blank glass, which ensures good precision of the product and saves costs at the same time.

When a film is applied to regular flat glass, a rolling direction of the roller in a film applying apparatus may be parallel to a long or short edge of the flat glass. Due to the special structure of the curved glass with two bent edges, if the former method of applying a film on flat glass is employed, an applying mechanism will interfere with a lower base and there will be some defects at particular positions on the curved glass due to the non-uniform pressure of the roller. Specifically, the decorative film will not be tightly adhered to the curved glass at a position where a small pressure is applied by the roller, while at a position where a large pressure is applied by the roller, the decorative film is in a too tight contact with the curved glass such that the film is damaged. Therefore, a film applying apparatus and method for 3D glass with two opposite curved edges are in demand in this field.

An automatic film applying apparatus is provided in the patent application No. CN201510351281.X, including a jig mechanism, a turnover mechanism, a rubber-covered roller mechanism, a positioning mechanism, a film tearing mechanism and a platform. A glass screen is placed on the jig mechanism, the jig mechanism is mounted on a turnover shaft, and the turnover mechanism is fixed to a machine tool; the platform is arranged below the turnover mechanism, a soft film is fixed to an upper end of the platform, and an adhering start end of the soft film extends out of a side end of the platform; the positioning mechanism is arranged at the same side of the platform as the adhering start end of the soft film, the positioning mechanism includes a positioning member for positioning the adhering start end of the soft film in an X-axis direction, a positioning member translation mechanism, and a second driver for driving the positioning member to move horizontally; the rubber-covered roller mechanism is located below the adhering start end of the soft film. Based on the above structure, the present application can achieve automatic adhesion between a glass screen with a curved surface having a large curvature or a varied curvature and a soft film, and the soft film can be automatically adhered while the protective film is being torn off, which prevents adhesion of dust and improves working efficiency.

In the above patent application, the glass screen is arranged on the turnover shaft, the soft film is arranged below the turnover shaft and the glass screen, and the film is automatically adhered while the protective film is being torn off. However, the apparatus according to the above patent application is not suitable for applying film to 3D glass with two opposite curved edges. Therefore, a film applying apparatus and method with high precision and high efficiency for 3D glass with two opposite curved edges are still in demand in the field.

SUMMARY

A film applying apparatus for 3D glass with two opposite curved edges is provided according to the present application, which includes: an upper base configured to fix a film; a lower base configured to fix the 3D glass; a roller structure; a rotary cylinder connected to the upper base and configured to rotate the upper base; and a lifting cylinder configured to drive the upper base, the rotary cylinder and the roller structure to move up and down synchronously and drive the roller structure to apply pressure for adhering the 3D glass to the film. The roller structure includes a lower roller and an upper press roller. The rotary cylinder is configured to rotate the upper base to change or fix a relative position between the film fixed on the upper base and the roller structure. Axial directions of the lower roller and the press roller are arranged to be the same as a length direction of the two curved edges of the 3D glass fixed on the lower base, which enables the roller to roll one curved edge of the 3D glass first, then roll a plane portion of the 3D glass, and roll the other curved edge of the 3D glass last.

In a specific embodiment, the press roller includes a first press roller and a second press roller, and both the first press roller and the second press roller are located obliquely above the roller.

In a specific embodiment, the first press roller and the second press roller have equal diameters and both the first press roller and the second press roller are stainless steel press rollers, the roller is a silicone roller having a stainless steel inner core, the film is a PET (polyethylene terephthalate) film. The rotary cylinder, the lifting cylinder, and a driving component configured to drive the lower base to rectilinearly move in a horizontal plane are all connected to a controller.

In a specific embodiment, in a moving direction of the lower base from rear to front, the first press roller in the front of the roller structure is arranged lower than the second press roller at the rear of the roller structure.

In a specific embodiment, the film applying apparatus further includes two horizontal cylinders and two stop pieces configured to accurately position the 3D glass on the lower base. One horizontal cylinder and one stop piece thereof are respectively arranged at two sides of the 3D glass in a longitudinal direction of the 3D glass, and the other horizontal cylinder and the other stop piece thereof are respectively arranged at two sides of the 3D glass in a width direction of the 3D glass.

In a specific embodiment, a radius of an outer surface of the roller is less than or equal to a radius of an inner fillet R of the 3D glass.

A film applying method for 3D glass with two opposite curved edges is further provided according to the present application, and the method includes the following steps A to F:

in step A, the 3D glass with two opposite curved edges is placed in a mold cavity of a lower base with a concave surface of the 3D glass facing upward, the 3D glass is accurately positioned, and the 3D glass is fixed by vacuum adsorption; the film is placed on an upper base and is positioned to allow a part of the film to extend beyond the upper base, the film is fixed by vacuum adsorption, and then a release film on the film is torn off;

in step B, the rotary cylinder rotates the upper base and the film, to allow the part, extending beyond the upper base, of the film to rotate to be located below the roller, and the film is allowed to be at a certain angle with respect to the horizontal plane by rotation;

in step C, the lower base with the 3D glass fixed thereon rectilinearly moves in a front-rear direction of the horizontal plane to an adhering start position;

in step D, the lifting cylinder drives the upper base, the rotary cylinder, and the roller structure to move downward to the adhering start position, to allow the film to be in contact with the 3D glass and the roller to press the film and the 3D glass tightly;

in step E, the lifting cylinder is kept stationary after being lowered to a certain position, the lower base begins to move rectilinearly in the front-rear direction of the horizontal plane, the roller is kept pressing the film, and the movement of the lower base drives the roller to rotate, to press the film tightly against the 3D glass; during the adhesion process, vacuum is released to completely separate the upper base from the film, and the upper base is rotated by the rotary cylinder, to allow the upper base and the lower base not to interfere or collide with each other; and in step F, after the adhesion, vacuum of the lower base is released, and an adhered product is taken out of the lower base.

Preferably, in step F, the adhered products are placed in an extracting disk, and after being accumulated to a certain quantity, the products are delivered to a next procedure to be each coated with an oil-proof film on a front side of the 3D glass, and are then placed in a high pressure deaeration machine to be deaerated, for example, a deaeration pressure is 0.65 MPa, and a deaeration temperature is 65 degrees Celsius.

In a specific embodiment, the film applying process in step E is divided into four time periods, in a first time period, the film is applied to a first curved edge of the 3D glass, in a second time period, the film is to be applied to a plane portion of the 3D glass while the film is adsorbed to the upper base, in a third time period, the film is applied to the plane portion of the 3D glass while the film is separated from the upper base and the upper base begins to rotate, and in a fourth time period, the film is applied to a second curved edge of the 3D glass.

In an embodiment, during the first and fourth time periods of the film applying process, the lower base moves at a speed ranging from 1 mm/s to 10 mm/s, preferably from 2 mm/s to 8 mm/s, and during the second and third time periods of the film applying process, the lower base moves at a speed ranging from 20 mm/s to 800 mm/s, preferably from 50 mm/s to 200 mm/s. In a specific embodiment, a film applying pressure is kept at a gauge pressure ranging from 0.05 MPa to 0.4 MPa. In a specific embodiment, the above film applying method includes applying a film by the above film applying apparatus. In a specific embodiment, in step A, the two horizontal cylinders and two stop pieces are used to accurately position the 3D glass.

Beneficial Effects:

1) The application adopts the method that the rotary cylinder controls the upper base and the method that the lifting cylinder controls the upper base and the roller structure uniformly, in conjunction with the method of completely separating the film from the upper base when rolling the plane portion of the curved glass, so that the film applying apparatus according to the present application can ensure that the film is below the roller during adhesion and an initial angle between the film and the horizontal plane, and can also ensure that there is no interference between the upper and lower bases, and can further ensure that the roller structure provides a stable pressure for the adhesion between the 3D glass and the film. The apparatus according to the present application has a simplified structure and easily-accessible parts, which is convenient in production and has a good film applying effect.

2) The present application adopts the roller structure including the roller and the press rollers, which distinguishes from the manner in the conventional technology that only one roller is used, such that the roller in the present application is not apt to be deformed, and the roller structure can provide a stable pressure for the adhesion between the 3D glass and the film, to achieve an ideal effect of the adhesion between the film and the 3D glass.

3) The present application adopts the method of preliminary positioning the 3D glass by the mold cavity and accurately positioning the 3D glass by the horizontal cylinders and stop pieces, which makes the positioning of the 3D glass in the present application more accurate, the adhesion more precise and the yield of the film applying higher.

4) The method according to the application are perfectly suitable for applying a film to 3D glass with two opposite curved edges, which is convenient to operate, has a high film applying precision and a high applying efficiency.

BRIEF DESCRIPTION OF THE DRAWINGS

The drawings which constitute a part of the present application are provided for better understanding the present application, and the exemplary embodiments and the description thereof according to the present application are for interpreting rather than inappropriately limiting the present application. In the drawings:

Both

FIG. 2a is a front view thereof, and FIG. 2b is a top view thereof;

FIG. 3a is a front view thereof, and FIG. 3b is a side view thereof;

Figure 1A:
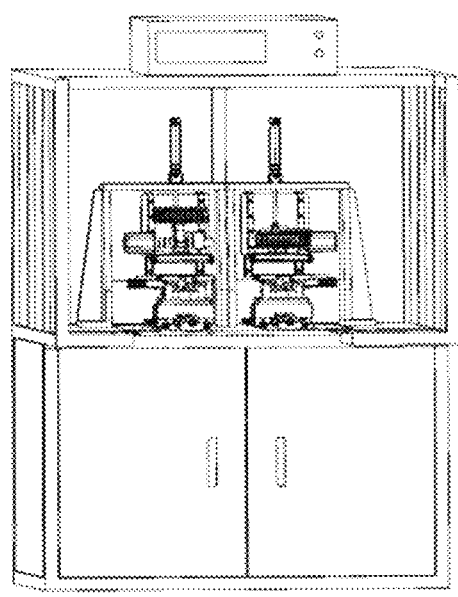
FIG. 1(a) and FIG. 1(b) are schematic views showing the structure of a film applying apparatus according to the present application.

| Reference Numerals in the drawings: | | | |
|---|---|---|---|
| 1 | film applying apparatus, | 11 | upper base, |
| 12 | lower base, | 13 | roller structure, |
| 131 | roller, | 132 | press roller, |
| 132a | first press roller, | 132b | second press roller, |
| 14 | rotary cylinder, | 15 | lifting cylinder, |
| 2 | 3D glass, | 21 | inner fillet R of 3D glass, |
| 3 | film. | | |

DETAIL DESCRIPTION OF EMBODIMENTS

The embodiments according to the present application are described hereinafter in detail in conjunction with the drawings; however, the present application can be implemented in various manners defined and covered by the claims.

Figure 1B:
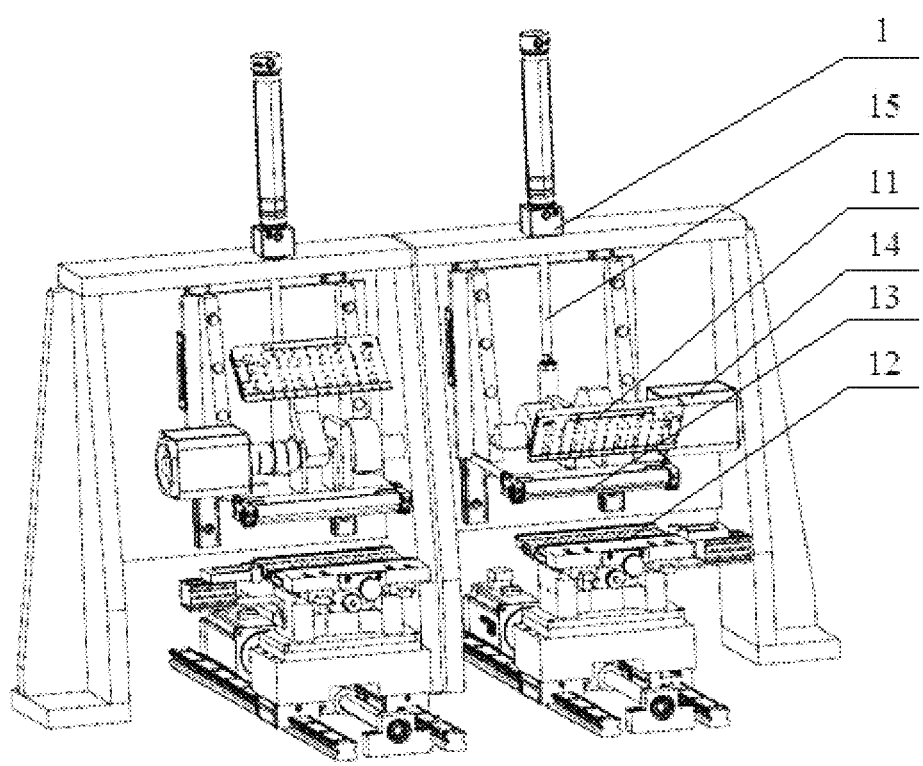

FIG. 1 is a schematic view showing the structure of a film applying apparatus according to the present application. As shown in the figure, the film applying apparatus 1 includes: an upper base 11 configured to a film 3; a lower base 12 configured to fix 3D glass 2; a roller structure 13; a rotary cylinder 14 configured to rotate the upper base; and a lifting cylinder 15 configured to drive the upper base, the rotary cylinder and the roller structure to move up and down and drive the roller structure to apply pressure on the 3D glass and the film. In the present application, the roller, the rotary cylinder and the upper base are all separately mounted components, which may all be fixed on a support plate driven by upper and lower cylinders.

Figure 2:
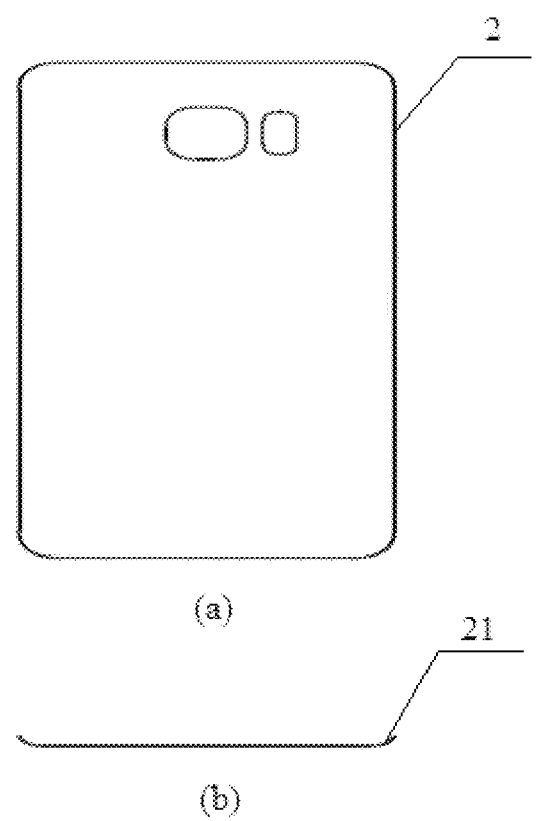
FIG. 2 is a schematic view showing the structure of 3D glass, specifically.
Figure 3:
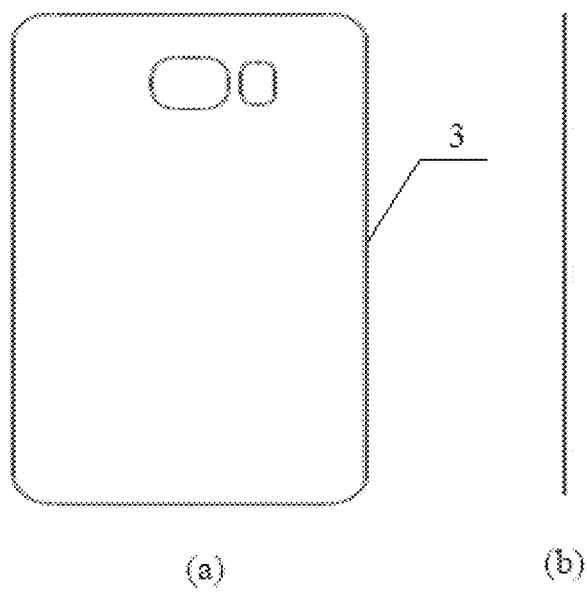
FIG. 3 is a schematic view showing the structure of a film, specifically.

FIG. 2 and FIG. 3 are respectively schematic views showing the structure of the 3D glass and the film, as shown in the figures, two opposite edges (two long edges of the 3D glass) of the 3D glass are curved edges, and the film is a plane film having a front shape substantially the same as that of the 3D glass. Specifically, a total height of the 3D glass is less than or equal to 4 mm, a thickness of the 3D glass generally ranges from 0.15 mm to 0.8 mm, for example, 0.4 mm or 0.55 mm, and a radius of an inner fillet R of the 3D glass is greater than or equal to 4.5 mm. A total thickness of the film is similar to that of the 3D glass. The decorative film (the film) has three layers. A first layer is a release film, a second layer is a PET film, and a third film is a protective film. A surface of the PET film of the second layer in contact with the release film is coated with OCA (Optically Clear Adhesive) glue, and the surface is configured to be adhered to an inward concave surface of the 3D glass; another surface of the PET film of the second layer is screen printed with ink, and the protective film is configured to protect the ink screen printed on the PET film. In the present application, the 3D glass with two opposite curved edges as shown in the figure is generally used as a front cover or a rear cover of a mobile phone, when the 3D glass is used as a front cover of a mobile phone, a frame region of the decorative film thereof is screen printed with ink, and when the 3D glass is used as a rear cover of a mobile phone, a whole surface of the decorative film thereof is screen printed with ink. The 3D glass in the present application may have curved edges in a length direction and straight edges in a width direction, or may have curved edges in the width direction and straight edges in the length direction, which is not limited in the present application.

Figure 4:
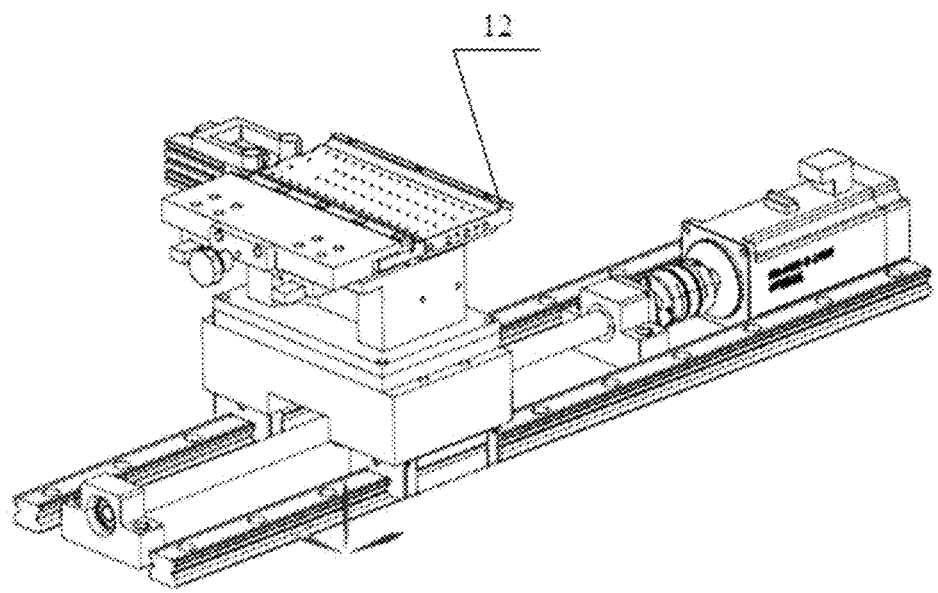
FIG. 4 is a schematic view showing the structure of a lower base of the film applying apparatus.

FIG. 4 is a schematic view showing the structure of a lower base of the film applying apparatus. Specifically, automatically positioning cylinders are provided in both a long-edge direction and a short-edge direction of the lower base. The lower base is divided into two portions, wherein a big portion has a suction hole, a short edge positioning block, and a positioning cylinder, while a small portion mainly plays a role of positioning in the long-edge direction through the positioning cylinder which is located in the long-edge direction. A transmission mechanism of the lower base determines a specific adhering speed by setting speeds in different periods. In a preferable embodiment, a mold cavity is used to preliminarily position the 3D glass, and then two horizontal cylinders and two stop pieces are used to accurately position the 3D glass in the present application. In a film applying apparatus for flat glass, the flat glass is placed in the mold cavity of the lower base. Since the size of the mold cavity has to be larger than an upper limit value of the size of the flat glass and a margin of 0.02 mm should be provided at each side, for example, a length of one side of the flat glass is 50 mm, and the normal tolerance thereof is 0.005 mm, then the corresponding size of the die cavity should be 50.025 mm, which causes that the flat glass cannot be accurately positioned by the mold cavity. In the present application, the 3D glass is preliminarily positioned by the mold cavity, and then is accurately positioned by a positioning method with double cylinders and an L shape (including a straight edge and a curved edge). The cylinders and stop pieces all may be fixedly arranged on the bases of the apparatus.

Figure 5:
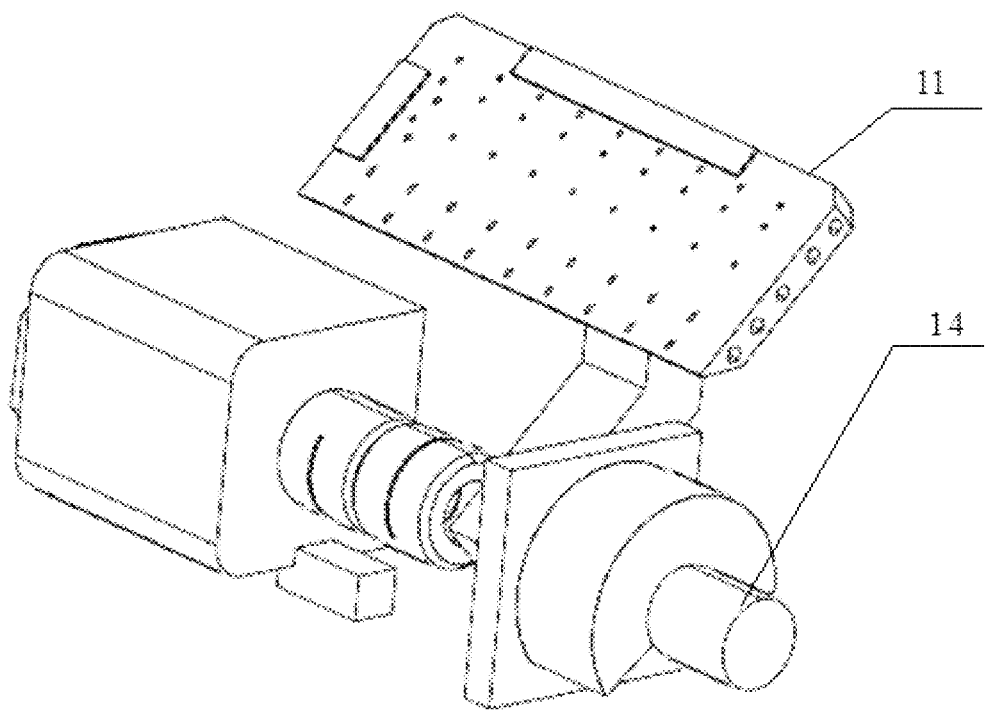
FIG. 5 is a schematic view showing the structure of an upper base and a rotary cylinder of the film applying apparatus.
Figure 6:
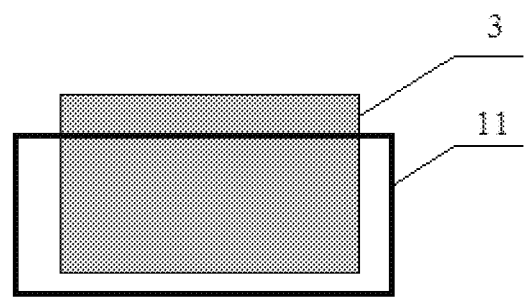
FIG. 6 is a schematic view showing that the upper base and the film are in an adsorbed state.

FIG. 5 is a schematic view showing the structure of an upper base and a rotary cylinder of the film applying apparatus. The upper base includes vacuum suction holes, and has its own L-shaped positioning edge. The film is adsorbed by the vacuum suction holes externally connected to a vacuum source, and the film is fitted against the L-shaped positioning edge for positioning. FIG. 6 is a schematic view showing that the upper base and the film are in an adsorbed state. The upper base is fixed to the support plate, another end of the support plate is connected to the rotary cylinder, and the rotary cylinder drives the whole upper base to rotate by rotation of the cylinder. The rotary cylinder has its own angle limiting mechanism, and an angle of rotation of the upper base may be adjusted by adjusting the angle limiting mechanism.

Figure 7:
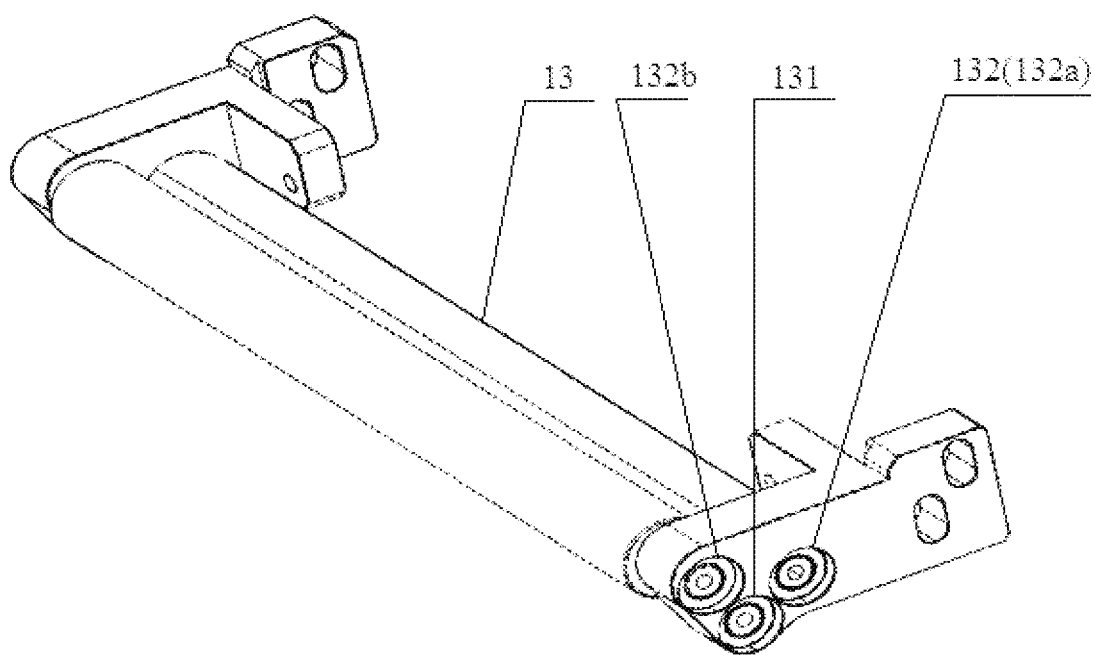
FIG. 7 is a schematic structural view of a roller structure of the film applying apparatus.

FIG. 7 is a schematic structural view of the roller structure of the film applying apparatus. The roller structure is fixed to the support plate, and the roller structure includes two stainless steel press rollers and a silicone roller arranged in parallel. The two stainless steel press rollers ensure that the whole silicone roller is subjected to a uniform force during rolling. A diameter of the silicone roller is 8 mm. Inventors of the present application have found through using that, in a case that the roller structure composed of a roller and two press rollers parallel to the roller is employed and the positional relationship between the two press rollers complies with a certain principle, the rolling pressure exerted for adhesion by the roller structure may be exerts the most uniform, and a rolling effect may be the best. Specifically, driven by a friction force, the two press rollers may rotate as the roller rotates. In the present application, the lower silicone roller (a diameter of a stainless steel inner core is 6 mm, and a thickness of a silicone layer is 1 mm, therefore a radius of the silicone roller is 4 mm) is configured to provide a direct pressure for the adhesion, while the two upper stainless steel press rollers (each having a diameter of 10 mm) are configured to ensure that the silicone roller will not be deformed and can exert an uniform pressure, which leads to an ideal effect of the adhesion of the film and the 3D glass.

Figure 8:
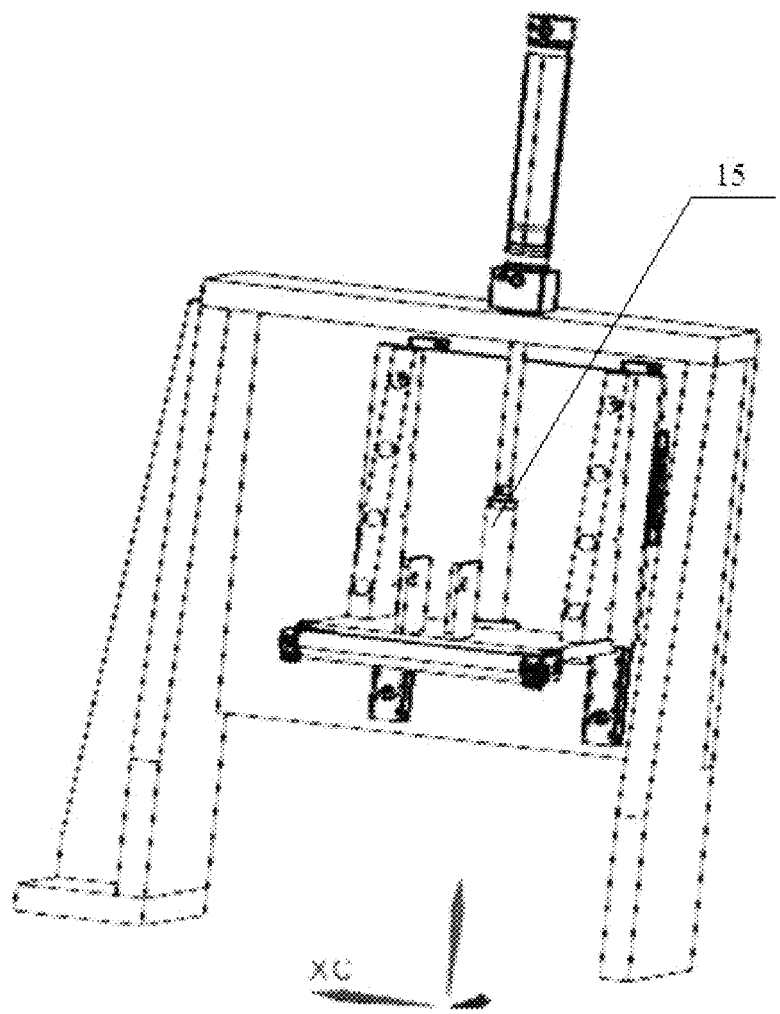
FIG. 8 is a schematic view showing the structure of a lifting cylinder of the film applying apparatus.

FIG. 8 is a schematic view showing the structure of the lifting cylinder of the film applying apparatus. A main function of the lifting cylinder is to lift or lower the upper base and the roller structure in position and keep the pressure which the roller exerts on the film during the adhesion of the film and the 3D glass. The roller pressure can be adjusted, for example, between 0.05 MPa and 0.4 MPa.

A film applying process in this embodiment includes following steps. The film is positioned on the upper base first, the upper base carrying the film may be driven by the rotary cylinder to rotate in a vertical direction, as shown in the figures, in the case that two lengthwise edges of the 3D glass are curved edges, and two widthwise edges thereof are straight edges, a width of the film is slightly greater than a width of the upper base and part of the film extends beyond the upper base (for example, about a part of 10 mm of the film in the width direction extends beyond the upper base), and a length of the film is smaller than a length of the upper base, so that the film can be accurately positioned on the upper base, and the method for positioning the film on the upper base is the same as that in the conventional technology. The film is fixed by vacuum adsorption after it is positioned, and then the release film of the film is torn off by a film tearing tape. The 3D glass is positioned on the lower base by the mold cavity of the lower base and the horizontal cylinder, and then the 3D glass is fixed by vacuum adsorption. The upper base is driven by the rotary cylinder to rotate to a position where the film is at an angle of about 15 degrees to 30 degrees with respect to the horizontal plane (or the plane portion of the 3D glass), and the part, extending beyond the upper base, of the film rotates to be located below the roller. After that, the lower base is horizontally moved back and forth to a rolling start position first, in a specific embodiment, the lower base is moved, by a leading screw, from a side away from the operator to the rolling start position close to the operator, and then the upper base and the roller are driven by the lifting cylinder to move downwards, so that the upper base and the roller are also moved downward to the rolling start position, and the film is in contact with the 3D glass at this time. The film is pressed at an adhering start position of the 3D glass by the roller, the whole film is still fixed on the upper base by vacuum adsorption, and the film is still at an angle of about 15 degrees to 30 degrees with respect to the horizontal plane. During the rolling process, a pressure is exerted on the roller to press the film and the 3D glass, driven by the back and forth horizontal movement of the lower base, the roller rotates, and no spontaneous rotational force is exerted on the roller. In a specific embodiment, during the adhesion process, the lower base moves from a side close to the operator to a side away from the operator under the transmission action of the leading screw, and during the adhesion process the curved edge of the 3D glass away from the operator is adhered first, and the curved edge of the 3D glass close to the operator is adhered last.

In the present application, the force exerted on the roller during the rolling process is kept uniform and constant, however, a rolling speed is low when rolling the curved edges, and the rolling speed is high when rolling the straight edges. The rolling process is divided into four periods, that is, rolling the first curved edge→rolling the plane portion (the film is adsorbed to the upper base)→rolling the plane portion (the film is separated from the upper base, and the upper base begins to rotate)→rolling the second curved edge. Specifically, the speed of rolling the curved edges (the moving speed of the lower base on the horizontal plane in a front-rear direction) is 5 mm/s, while the speed of rolling the plane portion is 100 mm/s. In the present application, the reason that the rolling the plane portion is required to be divided into two periods is that during the process of rolling the plane portion, the upper base is required to rotate in time to avoid the interference and collision between the upper base and the lower base when rolling the second curved edge. In other words, in the present application, the film must be separated from the upper base in time during the process of rolling the plane portion, thus can ensure that there is no bubble in the products obtained by adhesion and no interference between the upper base and the lower base. Specifically, in the case of ensuring that the upper base and the lower base will not interfere with each other, during the adhesion process, the time of separation between the film and the upper base is the later, the better. In a specific embodiment, the film is adsorbed to the upper base through multiple rows of vacuum suction holes parallel to the curved edges of the 3D glass, and the vacuum is gradually released through the vacuum suction holes row by row in the adhesion process as time passes. When the process arrives at a junction point between the second period and the third period, that is, when the upper base begins to rotate, the vacuum of all the vacuum suction holes is completely released. In other words, in the adhesion process, the vacuum is partially released first, and then completely released, such that the film is separated from the upper base, and then the upper base is rotated to avoid the interference with the lower base.

Correspondingly, when rolling a flat glass in a conventional apparatus, the film may be completely separated from the upper base only after the adhesion process is finished. A film applying apparatus for flat glass includes an upper base for fixing the film, a lower base for fixing the flat glass, a roller structure, and a rotary cylinder for rotating the upper base and the roller structure and making the roller structure provide a pressure for adhesion. The roller structure is a single silicone roller. Specifically, the flat glass is first placed into a mold cavity of the lower base, and is fixed by vacuum adsorption; the film is placed on the upper base and is fixed by vacuum adsorption, and a release film is torn off; the lower base is horizontally moved back and forth to a rolling start position first, then the upper base and the roller are driven to rotate by a rotary mechanism, to allow the film to be at an angle of about 15 degrees to 30 degrees with respect to the horizontal plane and rotate to a adhering start position (the film comes into contact with the flat glass); after rolling at a constant speed for a period, the film applying process for flat glass is completed. In the apparatus, the roller moves together with the upper base, and both the roller and the upper base are driven by the rotary cylinder to rotate in the vertical direction. The rotation of the rotary cylinder keeps the film at a certain angle with respect to the plane of the flat glass, and meanwhile allows a part of the film to be located below the roller. Besides, the roller can provide appropriate pressure for the adhesion. Specifically, the film is similarly positioned on the upper base by vacuum adsorption and a part of the film extends beyond the upper base after the film is positioned. But the conventional film applying apparatus for flat glass cannot apply film to curved glass, and in the case that the conventional film applying apparatus is employed to apply film to curved glass, there will be bubbles in the adhesion process, and the upper and lower bases will interfere and collide with each other.

The above is only the preferred embodiment of the present application, and is not intended to limit the present application. For those skilled in the art, various modifications and changes can be made to the present application. Any modification, equivalent substitution or modification made within the spirit and principle of the present application falls within the protection scope of the present application.

The invention claimed is:

1. A film applying method for 3D glass with two opposite curved edges, comprising the following steps:
   step A, placing the 3D glass with two opposite curved edges in a mold cavity of a lower base with a concave surface of the 3D glass facing upward, accurately positioning the 3D glass, and fixing the 3D glass by vacuum adsorption; placing a film on an upper base and positioning the film to allow a part of the film to extend beyond the upper base, fixing the film by vacuum adsorption, and then tearing off a release film on the film;
   step B, rotating, by a rotary cylinder, the upper base and the film, to allow the part, extending beyond the upper base, of the film to rotate to be located below a roller, to allow the film to be at a certain angle with respect to a horizontal plane;
   step C, rectilinearly moving the lower base on which the 3D glass is fixed in a front-rear direction of the horizontal plane to an adhering start position;
   step D, driving the upper base, the rotary cylinder, and a roller structure to move downward by the lifting cylinder to the adhering start position, to allow the film to be in contact with the 3D glass and the roller to press the film and the 3D glass tightly;
   step E, keeping the lifting cylinder stationary after lowering the lifting cylinder to a certain position, beginning to rectilinearly move the lower base in the front-rear direction of the horizontal plane, keeping the roller pressing the film, and rotating the roller by the movement of the lower base to press the film tightly against the 3D glass, and in the adhesion process, releasing vacuum to completely separate the upper base from the film, and rotating the upper base by the rotary cylinder, to allow the upper base and the lower base not to interfere or collide with each other; and
   step F, after the adhesion, releasing vacuum of the lower base, and taking an adhered product out of the lower base.

2. The film applying method according to claim 1, wherein in step E, the film applying process is divided into four time periods, in a first time period, the film is applied to a first curved edge of the 3D glass; in a second time period, the film is to be applied to a plane portion of the 3D glass while the film is adsorbed to the upper base; in a third time period, the film is applied to the plane portion of the 3D glass while the film is separated from the upper base and the upper base begins to rotate, and in a fourth time period, the film is applied to a second curved edge of the 3D glass.

3. The film applying method according to claim 2, wherein in the first time period and the fourth time period of the film applying process, the lower base moves at a speed ranging from 1 mm/s to 10 mm/s, and in the second time period and the third time period of the film applying process, the lower base moves at a speed ranging from 20 mm/s to 800 mm/s.

4. The film applying method according to claim 3, wherein in the first time period and the fourth time period of the film applying process, the lower base moves at a speed ranging from 2 mm/s to 8 mm/s, and in the second time period and the third time period of the film applying process, the lower base moves at a speed ranging from 50 mm/s to 200 mm/s.

5. The film applying method according to claim 2, wherein a film applying pressure is kept at a gauge pressure ranging from 0.05 MPa to 0.4 MPa.

6. The film applying method according to claim 1, wherein the film applying method comprises applying a film by the film applying apparatus according to claim 1.

7. The film applying method according to claim 2, wherein in step A, two horizontal cylinders and two stop pieces are used to accurately position the 3D glass.

8. A film applying apparatus for 3D glass with two opposite curved edges, comprising:
   an upper base configured to fix a film;
   a lower base configured to fix the 3D glass;
   a roller structure;
   a rotary cylinder connected to the upper base and configured to rotate the upper base; and
   a lifting cylinder configured to drive the upper base, the rotary cylinder and the roller structure to move up and down synchronously and drive the roller structure to apply pressure for adhering the 3D glass to the film,
   wherein the roller structure comprises a lower roller and an upper press roller the rotary cylinder is configured to rotate the upper base to change or fix a relative position between the film fixed on the upper base and the roller structure, axial directions of both the lower roller and the press roller are arranged to be the same as a length direction of the two curved edges of the 3D glass fixed on the lower base, which allows the roller to roll one curved edge of the 3D glass first, then roll a plane portion of the 3D glass, and roll the other curved edge of the 3D glass last.

9. The film applying apparatus according to claim 8, wherein the press roller comprises a first press roller and a second press roller, and both the first press roller and the second press roller are located obliquely above the roller.

10. The film applying apparatus according to claim 9, wherein the first press roller and the second press roller have equal diameters and both the first press roller and the second press roller are stainless steel press rollers, the roller is a silicone roller having a stainless steel inner core, the film is a PET (polyethylene terephthalate) film, and the rotary cylinder, the lifting cylinder, and a driving component configured to drive the lower base to rectilinearly move in a horizontal plane are all connected to a controller.

11. The film applying apparatus according to claim 9, wherein in a moving direction of the lower base from rear to front, the first press roller in the front of the roller structure is arranged lower than the second press roller at the rear of the roller structure.

12. The film applying apparatus according to claim 8, further comprising two horizontal cylinders and two stop pieces configured to accurately position the 3D glass on the lower base, wherein one horizontal cylinder and one stop piece are respectively arranged at two sides of the 3D glass in a length direction of the 3D glass, and the other horizontal cylinder and the other stop piece are respectively arranged at two sides of the 3D glass in a width direction of the 3D glass.

13. The film applying apparatus according to claim 8, wherein a radius of an outer surface of the roller is less than or equal to a radius of an inner fillet R of the 3D glass.

14. The film applying apparatus according to claim 9, further comprising two horizontal cylinders and two stop pieces configured to accurately position the 3D glass on the lower base, wherein one horizontal cylinder and one stop piece are respectively arranged at two sides of the 3D glass in a length direction of the 3D glass, and the other horizontal cylinder and the other stop piece are respectively arranged at two sides of the 3D glass in a width direction of the 3D glass.

15. The film applying apparatus according to claim 10, further comprising two horizontal cylinders and two stop pieces configured to accurately position the 3D glass on the lower base, wherein one horizontal cylinder and one stop piece are respectively arranged at two sides of the 3D glass in a length direction of the 3D glass, and the other horizontal cylinder and the other stop piece are respectively arranged at two sides of the 3D glass in a width direction of the 3D glass.

16. The film applying apparatus according to claim 11, further comprising two horizontal cylinders and two stop pieces configured to accurately position the 3D glass on the lower base, wherein one horizontal cylinder and one stop piece are respectively arranged at two sides of the 3D glass in a length direction of the 3D glass, and the other horizontal cylinder and the other stop piece are respectively arranged at two sides of the 3D glass in a width direction of the 3D glass.

17. The film applying apparatus according to claim 9, wherein a radius of an outer surface of the roller is less than or equal to a radius of an inner fillet R of the 3D glass.

18. The film applying apparatus according to claim 10, wherein a radius of an outer surface of the roller is less than or equal to a radius of an inner fillet R of the 3D glass.

19. The film applying apparatus according to claim 11, wherein a radius of an outer surface of the roller is less than or equal to a radius of an inner fillet R of the 3D glass.

* * * * *